US009810172B2

(12) United States Patent
Mitani et al.

(10) Patent No.: US 9,810,172 B2
(45) Date of Patent: Nov. 7, 2017

(54) CONTROL DEVICE FOR INTERNAL COMBUSTION ENGINE

(75) Inventors: Shinichi Mitani, Susono (JP); Eiji Murase, Gotenba (JP); Takahiro Tsukagoshi, Susono (JP); Kazuhisa Matsuda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/363,167

(22) PCT Filed: Dec. 8, 2011

(86) PCT No.: PCT/JP2011/078468
§ 371 (c)(1),
(2), (4) Date: Jun. 5, 2014

(87) PCT Pub. No.: WO2013/084344
PCT Pub. Date: Jun. 13, 2013

(65) Prior Publication Data
US 2014/0318501 A1 Oct. 30, 2014

(51) Int. Cl.
*F02M 51/00* (2006.01)
*F02D 41/30* (2006.01)
(Continued)

(52) U.S. Cl.
CPC ........... *F02D 41/30* (2013.01); *F02D 19/061* (2013.01); *F02D 19/0692* (2013.01);
(Continued)

(58) Field of Classification Search
USPC ....................................................... 123/478
See application file for complete search history.

(56) References Cited

U.S. PATENT DOCUMENTS 7,213,574 B2 * 5/2007 Nishimura ............ F02D 41/022
123/431
2006/0207565 A1 9/2006 Nishimura
(Continued)

FOREIGN PATENT DOCUMENTS

CN  101142398 A  3/2008
JP  2009-030573 A  2/2009

*Primary Examiner* — Carlos A Rivera
*Assistant Examiner* — Ruben Picon-Feliciano
(74) *Attorney, Agent, or Firm* — Andrews Kurth Kenyon LLP

(57) ABSTRACT

An objective of the present invention is to stabilize the fuel injection amount for each cylinder and to execute fuel injection control accurately in a single-pressure-feed dual-injection type alcohol fuel injection system. An engine includes two injection valves and and a single-pressure-feed dual-injection type fuel supply system. The fuel supply system is configured such that fuel is injected sequentially in two cylinders during the pressure-feed-interval period from the execution of one fuel pressure-feed operation to the execution of the next fuel pressure-feed operation. If the alcohol concentration in the fuel is higher than a predetermined determination value γ at a startup operation time, an ECU executes only a cylinder injection for the first of the two cylinders described above, and executes both an intake passage injection and a cylinder injection for the second cylinder. Thus, even if the fuel pressure decreases due to the fuel injection for the first cylinder, the required fuel injection amount can be reserved for the second cylinder.

3 Claims, 4 Drawing Sheets

(51) Int. Cl.
*F02D 41/00* (2006.01)
*F02D 41/04* (2006.01)
*F02D 19/06* (2006.01)
*F02D 19/08* (2006.01)

(52) U.S. Cl.
CPC ......... *F02D 19/084* (2013.01); *F02D 19/087* (2013.01); *F02D 41/008* (2013.01); *F02D 41/0025* (2013.01); *F02D 41/047* (2013.01); *F02D 41/3094* (2013.01); *F02D 19/0689* (2013.01); *F02D 2200/0611* (2013.01); *Y02T 10/36* (2013.01)

(56) References Cited

U.S. PATENT DOCUMENTS

| | | | |
|---|---|---|---|
| 2008/0288158 A1* | 11/2008 | Leone | 701/103 |
| 2009/0248275 A1* | 10/2009 | Ichihara | F02D 29/02 701/103 |
| 2010/0049424 A1* | 2/2010 | Tashima et al. | 701/103 |
| 2010/0145596 A1* | 6/2010 | Nishimura | 701/103 |
| 2012/0150419 A1* | 6/2012 | Pursifull | F02D 41/0027 701/104 |

* cited by examiner

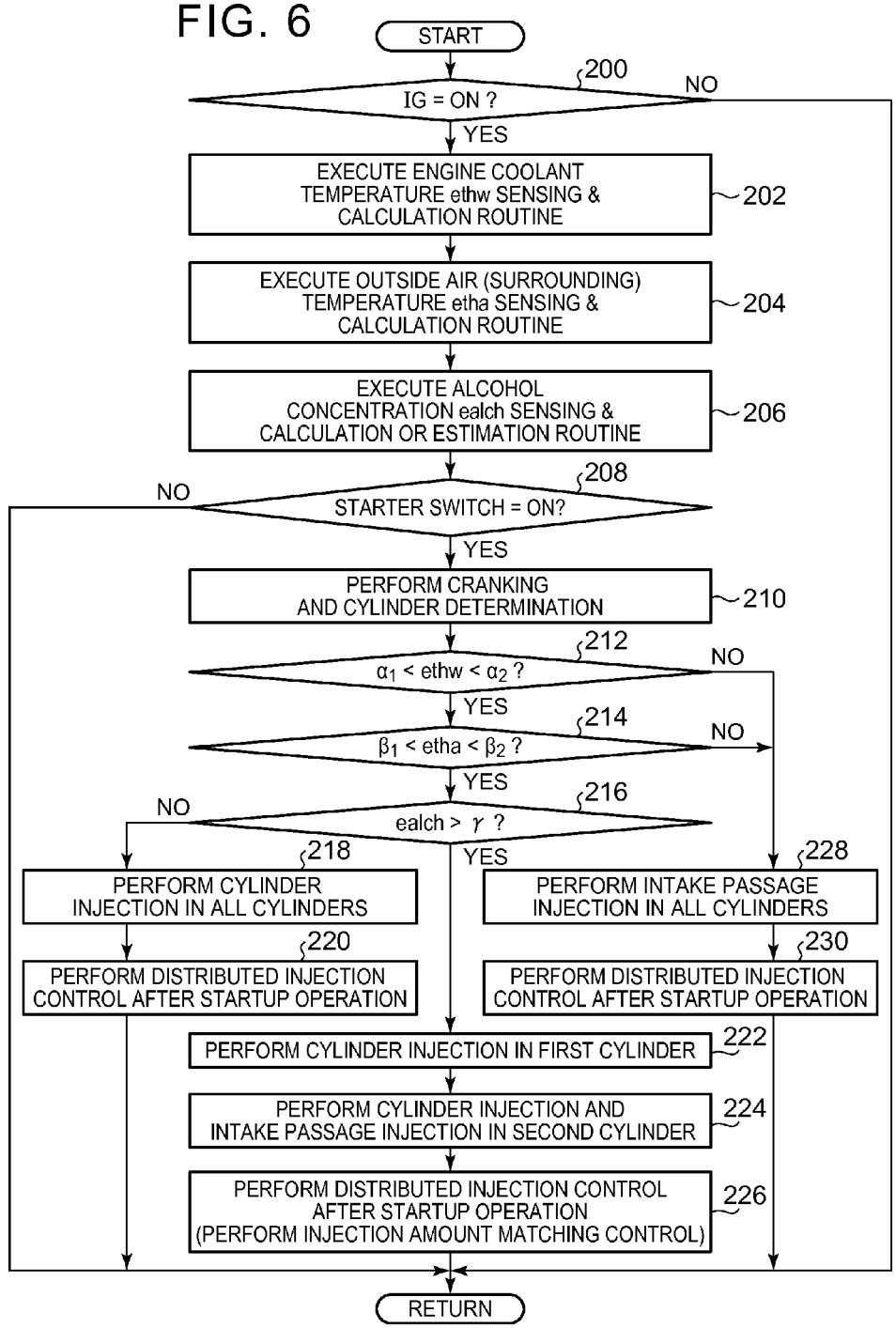

CONTROL DEVICE FOR INTERNAL COMBUSTION ENGINE

CROSS-REFERENCE TO RELATED APPLICATIONS

This is a national phase application based on the PCT International Patent Application No. PCT/JP2011/078468 filed on Dec. 8, 2011, the entire contents of which are incorporated herein by reference.

TECHNICAL FIELD

The present invention relates to a control device for an internal combustion engine that is mounted, for example, in an FFV (Flexible Fuel Vehicle) and uses alcohol fuel, and more particularly to a control device for an internal combustion engine that has a single-pressure-feed dual-injection type fuel supply system.

BACKGROUND ART

As a conventional technology, a control device for an internal combustion engine that has a single-pressure-feed dual-injection type fuel supply system is known as described in Japanese Patent Application Publication No. 2009-30573 (JP 2009-30573 A). A single-pressure-feed dual-injection type fuel supply system has a pump-driving cam on which the number of convex parts equivalent to half the number of cylinders are formed. This pump-driving cam rotates once each time the crankshaft rotates twice (one cycle) to cause each convex part to drive a fuel pump. That is, a single-pressure-feed dual-injection type fuel supply system is configured in such a way that, while the fuel pump performs the fuel pressure-feed operation once, the two-cylinder fuel injection is performed. Such a single-pressure-feed dual-injection type fuel supply system may also be employed in an internal combustion engine that uses alcohol fuel.

CITATION LIST

Patent Literature

Patent Literature 1: Japanese Patent Application Publication No. 2009-30573 (JP 2009-30573 A)

SUMMARY OF THE INVENTION

Technical Problem

In the conventional technology, the following problems arise when a single-pressure-feed dual-injection type fuel supply system is applied to alcohol fuel. When alcohol fuel is used, the fuel injection amount tends to increase as the alcohol concentration in the fuel increases. However, in a single-pressure-feed dual-injection type fuel supply system, the fuel injection pressure (fuel pressure) for two cylinders is maintained by one fuel pressure-feed operation. Therefore, the problem with the conventional technology is that, when the fuel injection amount for the first cylinder is increased, the fuel pressure at the time of fuel injection for the second cylinder is decreased and therefore the fuel injection amount for the second cylinder is decreased.

A possible solution for this problem is the employment of a large fuel pump adaptable for high alcohol concentration fuel. However, this method makes it difficult to reserve space for installing a fuel pump and, in addition, involves an increase in the size and the weight of a fuel supply system.

It is an object of the present invention to solve the problems described above. More specifically, an object of the present invention is to provide a control device for an internal combustion engine capable of stabilizing the fuel injection amount for each cylinder for accurately performing fuel injection control in a single-pressure-feed dual-injection type alcohol fuel injection system.

Solution to Problem

A first invention comprises an intake passage injection valve provided in each of cylinders of the internal combustion engine for injecting fuel into an intake passage;
- a cylinder injection valve provided in each of the cylinders for injecting fuel into an inside of the cylinder;
- a fuel supply system that has a pump function for pressure-feeding alcohol fuel to each of the cylinders and is configured to sequentially perform fuel injection into two cylinders during a pressure-feed-interval period, the pressure-feed-interval period being a period from a time one fuel pressure-feed operation is performed to a time a next fuel pressure-feed operation is performed;
- alcohol concentration detection means for detecting an alcohol concentration in the fuel;
- first injection control means for injecting fuel from the cylinder injection valve into a first cylinder and a second cylinder, which are two cylinders for which fuel injection is sequentially performed during the pressure-feed-interval period, if the alcohol concentration in the fuel is equal to or lower than a predetermined determination value; and
- second injection control means for injecting fuel from the cylinder injection valve into the first cylinder and for injecting fuel from both the intake passage injection valve and the cylinder injection valve into the second cylinder if the alcohol concentration in the fuel is higher than the determination value.

According to a second invention, the first and the second injection control means are each configured to operate only at a time of a startup operation when a predetermined condition is satisfied, the control device further comprising:
- distributed injection control means for performing an operation, instead of the first and the second injection control means after the startup operation is ended, to variably set a fuel injection ratio between the intake passage injection valve and the cylinder injection valve in the first cylinder and the second cylinder respectively according to an operation state of the internal combustion engine.

A third invention further comprises injection amount addition means for adding a wall fuel adhesion amount to a fuel injection amount of the intake passage injection valve in the second cylinder when the second injection control means is performed, the wall fuel adhesion amount being an amount of fuel adhered to a wall surface of the intake passage; and
- injection amount matching means for setting the fuel injection amount of the intake passage injection valve in the second cylinder to an amount smaller than a fuel injection amount of the first cylinder by the wall fuel adhesion amount when the distributed injection control means is performed after the second injection control means is performed.

Advantageous Effects of Invention

According to the first invention, even if the fuel pressure is decreased due to a fuel injection in the first cylinder in a single-pressure-feed dual-injection type fuel supply system, fuel injection can be performed in the second cylinder using the intake passage injection valve and the cylinder injection valve and, therefore, a required amount of fuel injection can be reserved. That is, even when the alcohol concentration in the fuel is high, the fuel injection amount of each cylinder can be stabilized. Therefore, fuel injection control for alcohol fuel can be performed accurately without having to use a large fuel pump of single-pressure-feed dual-injection type.

According to the second invention, even if the alcohol concentration in the fuel is high at a startup operation time when the fuel injection amount increases, the second injection control means can stabilize the fuel injection amount of each cylinder, reliably avoiding a decrease in the fuel injection amount. In addition, after the startup operation, the distributed injection control means can appropriately set a fuel injection ratio between the cylinders.

According to the third invention, when the second injection control means performs operation, the injection amount addition means can add a wall fuel adhesion amount to the fuel injection amount of the intake passage injection valve in the second cylinder. This allows an amount of fuel flowing into the cylinder to be adequately controlled even when a part of injected fuel adheres to the wall surface of the intake passage. In addition, when the distributed injection control means performs operation, the injection amount matching means can match the difference between the first cylinder and the second cylinder in the injection amount (that is, whether or not the wall fuel adhesion amount is added) that is generated by the second injection control means. This matching control equalizes the amount of fuel, adhered to the wall surface of the intake passage, among the cylinders, thus preventing a variation in the air-fuel ratio between the cylinders.

BRIEF DESCRIPTION OF THE DRAWINGS

FIG. 6 is a flowchart showing control performed by an ECU in the second embodiment of the present invention.

MODES FOR CARRYING OUT THE INVENTION

First Embodiment
[Configuration of First Embodiment]

Figure 1:
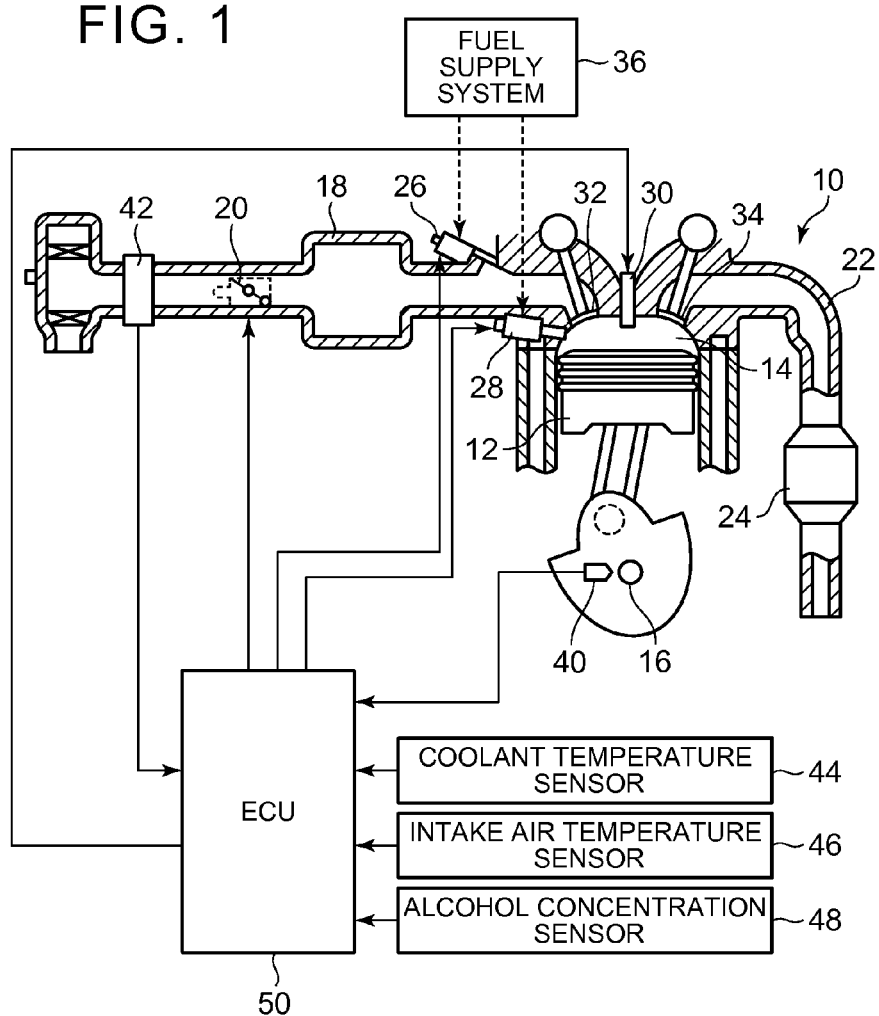
FIG. 1 is a configuration diagram showing a system configuration in a first embodiment of the present invention.

A first embodiment of the present invention is described below with reference to FIG. 1 to FIG. 3. FIG. 1 is a general configuration diagram showing a system configuration in the first embodiment of the present invention. The system in this embodiment has a multi-cylinder engine 10 as an internal combustion engine mounted in a vehicle such as an FFV. Alcohol fuel, such as methanol and ethanol, and gasoline may be used for the engine 10. FIG. 1 shows an example of one cylinder of multiple cylinders mounted in the engine 10. A combustion chamber 14 is formed in each cylinder of the engine 10 by a piston 12 that is linked to a crankshaft 16. The engine 10 includes an intake passage 18 through which air is taken into each cylinder, and the intake passage 18 includes an electronically controlled throttle valve 20 that regulates the intake air amount.

On the other hand, the engine 10 includes an exhaust gas passage 22 through which exhaust gas in each cylinder is exhausted, and the exhaust gas passage 22 includes a catalyst 24 such as a three-way catalyst for purifying exhaust gas. Each cylinder of the engine includes an intake passage injection valve 26 via which fuel is injected into the intake passage 18 (intake port), a cylinder injection valve 28 via which fuel is injected into the combustion chamber 14 (cylinder), a spark plug 30 that ignites fuel-air mixture, an intake valve 32 that opens and closes the intake passage 18 to the cylinder, and an exhaust valve 34 that opens and closes the exhaust gas passage 22 to the cylinder. In the description below, fuel injection performed via the intake passage injection valve 26 is denoted as "intake passage injection", and fuel injection via the cylinder injection valve 28 is denoted as "cylinder injection".

The engine 10 further includes a fuel supply system 36 that supplies (pressure-feeds) alcohol fuel, stored in a fuel tank in a vehicle, to the injection valves 26 and 28. The fuel supply system 36, with a known configuration such as that described in Japanese Patent Application Publication No. 2009-30573 (JP 2009-30573 A), includes a single-pressure-feed dual-injection type fuel pump (not shown). That is, the fuel supply system 36 is configured such that fuel is injected sequentially in two cylinders during the pressure-feed-interval period from the execution of a first fuel pressure-feed operation to the execution of the next fuel pressure-feed operation.

The system in this embodiment includes a sensor system, which includes various sensors required for controlling the engine, and an ECU (Engine Control Unit) 50 that controls the operation state of the engine. First, the sensor system is described. A crank angle sensor 40 outputs a signal that synchronizes with the rotation of the crankshaft 16, and an airflow sensor 42 detects the intake air amount of the engine. A water temperature sensor 44 detects the temperature of engine cooling water (engine water temperature) as an example of an engine temperature, and an intake air temperature sensor 46 detects the temperature of intake air, that is, the temperature of outside air (surrounding) around the engine. In addition, an alcohol concentration sensor 48, which detects an alcohol concentration in the fuel, configures alcohol concentration detection means in this embodiment. The sensor system includes other various sensors that are connected to the input side of the ECU 50. The actuators of the throttle valve 20, injection valves 26 and 28, and spark plug 30 are connected to the output side of the ECU 50.

The ECU 50 drives the actuators based on the engine operation information, detected by the sensor system, to perform operation control. More specifically, the ECU 50 detects the engine rotation rate (engine speed) and the crank angle based on the output of the crank angle sensor 40, and detects the intake air amount using the airflow sensor 42. The ECU 50 calculates the load rate (engine load) based on the engine rotation rate and the intake air amount, and calculates a fuel injection amount based on the intake air amount, load rate, and alcohol concentration in the fuel. In addition, the ECU 50 determines the fuel injection time and ignition time based on the crank angle and, when the fuel injection time arrives, drives the injection valves 26 and 28.

After that, when the ignition time arrives, the ECU 50 performs the ignition operation to turn on the spark plug 30. This operation burns fuel-air mixture in each cylinder for operating the engine.

[Characteristics of First Embodiment]

In the fuel supply system 36 of single-pressure-feed dual-injection type, it becomes difficult to maintain the fuel pressure when the fuel injection amount increases due to an increase in the alcohol concentration in the fuel. That is, when a large amount of fuel is injected in a cylinder which is one of the two cylinders in which fuel is injected first (first cylinder) during the pressure-feed-interval period of the fuel pump, the pressure in the fuel pipe remains low until the next fuel pressure-feed operation is performed. As a result, in the second cylinder in which fuel is injected (second cylinder), the fuel is injected with an insufficient fuel pressure with the result that the fuel injection amount tends to decrease. This phenomenon becomes obvious at a startup operation time when the fuel injection amount greatly increases. To address this problem, the first and second startup injection control described below is performed in this embodiment when the startup operation is performed. The startup operation refers to an operation performed before the engine is warmed up. More specifically, the startup operation is performed when a predetermined condition is satisfied (the engine water temperature and the catalyst temperature are suitable for the state before warming-up) and is ended when the condition is not satisfied.

(First Startup Injection Control)

This control is performed when the alcohol concentration in the fuel is equal to or lower than the determination value $\gamma$. In this control, only cylinder injection is performed for the first cylinder and the second cylinder (that is, cylinder injection is performed in all cylinders). Alcohol fuel, when used, has the property that the fuel injection amount is increased and the fuel volatility is decreased. The object of the first startup injection control is to inject fuel, which has property described above, directly in a cylinder to increase combustibility.

(Second Startup Injection Control)

The second startup injection control is performed when the alcohol concentration in the fuel is higher than the predetermined determination value $\gamma$. In this control, only cylinder injection is performed for the first cylinder while both intake passage injection and cylinder injection are performed for the second cylinder. FIG. 2 is a diagram showing the fuel injection state of the cylinders controlled by the second startup injection control. FIG. 2 shows an example of a six-cylinder engine with numerals (#1 to #6) assigned to the cylinders in the order in which fuel injection is performed. In the example shown in FIG. 2, cylinders #1, #3, and #5 correspond to the first cylinder described above, and cylinders #2, #4, and #6 correspond to the second cylinder described above.

The alcohol concentration determination value $\gamma$ is set as an upper limit value of alcohol concentration at which a decrease in the fuel injection amount in the second cylinder remain within an allowable range. That is, when the alcohol concentration in the fuel is equal to or lower than the determination value $\gamma$, the fuel injection amount in the first cylinder does not increase to a degree at which the fuel pressure (fuel injection amount in the second cylinder) is affected. Therefore, fuel injection may be performed also in the second cylinder only by cylinder injection. On the other hand, when the alcohol concentration is higher than the determination value $\gamma$, the fuel injection amount in the first cylinder increases to such a degree that the fuel pressure is decreased. This decrease in the fuel pressure may lead to a possibility that the degree of a decrease in the fuel injection amount in the second cylinder will exceed the allowable limit Therefore, in this case, not only cylinder injection but also intake passage injection is used in the second cylinder. In contrast, in the first cylinder in which fuel is injected first, there is no need to consider a decrease in the fuel pressure and, therefore, only cylinder injection is performed regardless of the alcohol concentration.

According to the control described above, the fuel supply system 36 of single-pressure-feed dual-injection type allows fuel injection to be performed in the second cylinder using the two injection valves 26 and 28 even when the fuel pressure is decreased due to the fuel injection in the first cylinder, thus enabling a required fuel injection amount to be reserved. That is, even when the alcohol concentration in the fuel is high, the fuel supply system 36 stabilizes the fuel injection amount of each cylinder. In particular, at a startup operation time when the fuel injection amount is increased, the system can reliably avoid a decrease in the fuel injection amount. This means that the system can perform fuel injection control for alcohol fuel accurately without having to use a large single-pressure-feed dual-injection type fuel pump.

(Injection Amount Addition Control)

Figure 2:
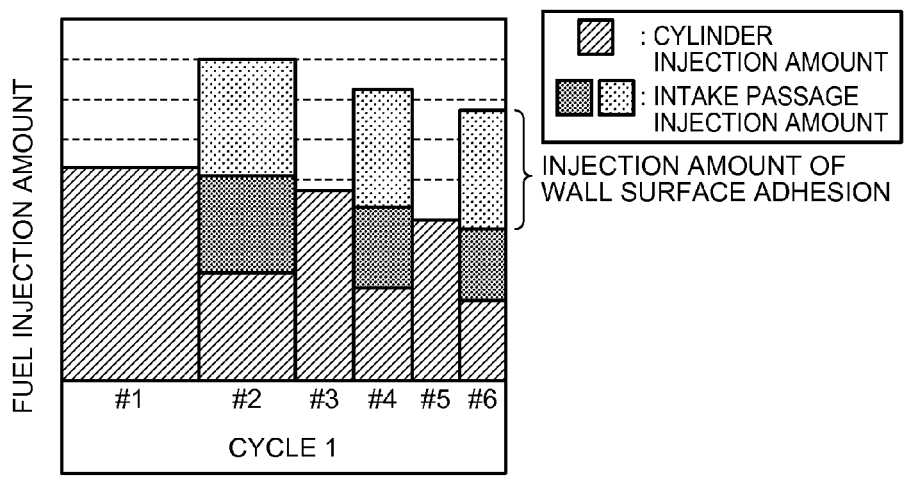
FIG. 2 is a diagram showing the fuel injection state of each cylinder controlled by second startup injection control.
Figure 3:
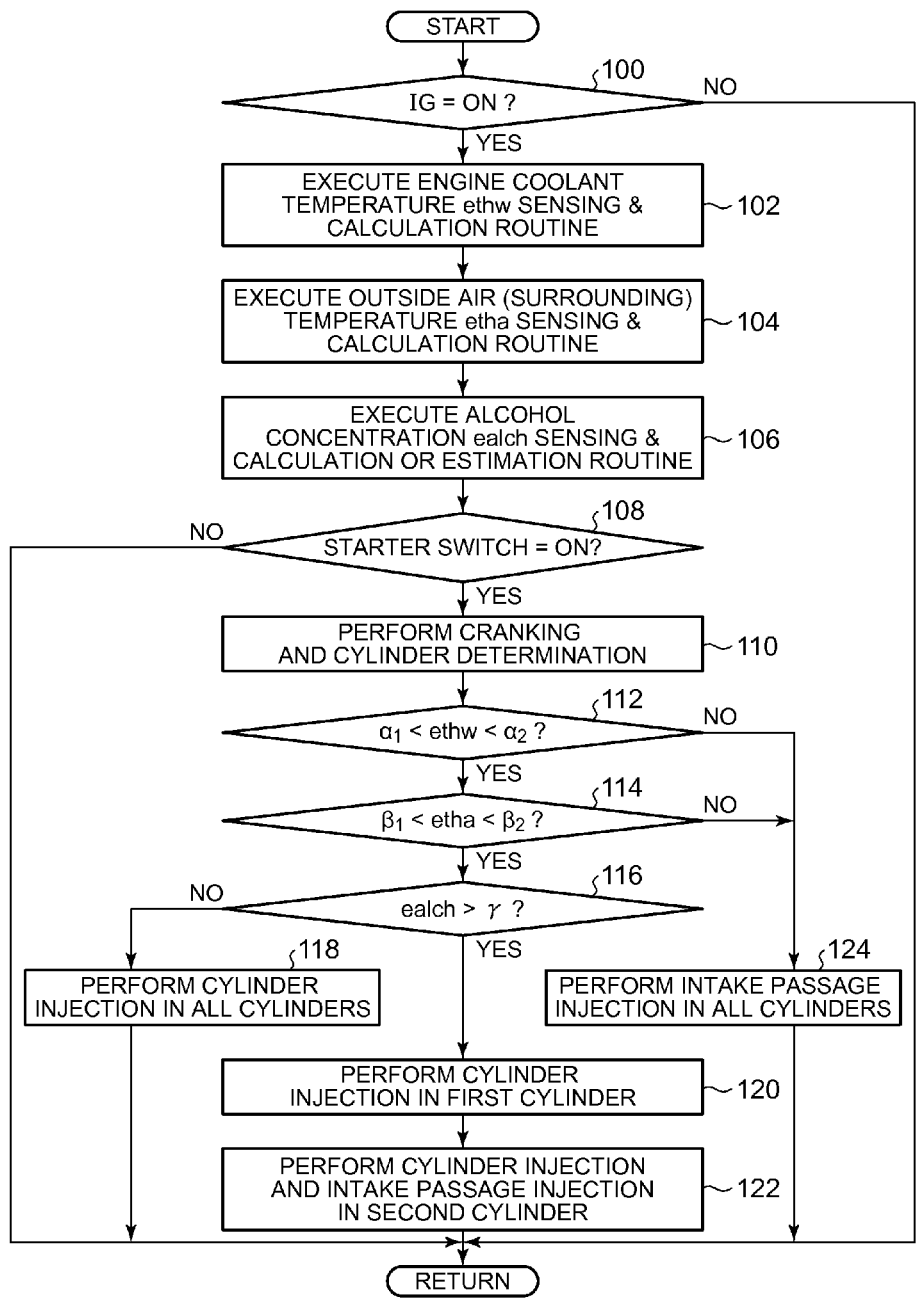
FIG. 3 is a flowchart showing the control performed by an ECU in the first embodiment of the present invention.

When the second startup injection control is performed, injection amount addition control is performed as shown in FIG. 2. In this control, the injection amount of a wall surface adhesion (hereinafter called wall fuel adhesion amount) is added to the intake passage injection amount in the second cylinder. The wall fuel adhesion amount is defined as the amount of fuel injected from the intake passage injection valve 26 and adhered to the wall of the intake passage (intake port). The wall fuel adhesion amount is calculated by a known method based, for example, on the engine water temperature, intake air temperature, fuel injection amount, and alcohol concentration in the fuel. This adequately controls the amount of fuel flowing into the cylinder even when a part of injected fuel adheres to the wall of the intake passage.

(Distributed Injection Control)

In this embodiment, the first and second startup injection controls are performed only at a startup operation time. After the startup operation is ended, distributed injection control is performed instead of those injection controls. In the distributed injection control, the ratio (fuel injection ratio) between the intake passage injection amount and the cylinder injection amount in each cylinder is variably set according to the operation state of the engine. This control is known control disclosed in Japanese Patent Application Publication No. 2010-261364 (JP 2010-261364 A).

[Actual Processing for Implementing the First Embodiment]

Next, the actual processing for implementing the first embodiment of the present invention is described below with reference to FIG. 3. FIG. 3 is a flowchart showing the control performed by the ECU in the first embodiment of the present invention. In the routine shown in this figure, the ECU first determines in step 100 whether the ignition switch (IG) is ON. If the ignition switch is ON, the processing proceeds to step 102. In steps 102, 104, and 106, the ECU calculates the engine water temperature ethw, outside air (surrounding) temperature etha, and alcohol concentration in the fuel ealch based on the output of the sensor system. The alcohol concentration ealch may be estimated based on the exhaust air-fuel ratio without using the alcohol concentration sensor 48.

Next, in step 108, the ECU determines whether the starter switch is ON. If the starter switch is ON, the ECU drives the starter motor in step 110 to perform cranking and, at the same time, performs cylinder determination based on the output of the crank angle sensor 40. Next, in step 112, the ECU determines whether the engine water temperature ethw is in a predetermined temperature range ($\alpha 1 <$ ethw $< \alpha 2$) suitable for starting cylinder injection. If this determination is satisfied, the ECU determines in step 114 whether the outside air temperature etha is in a predetermined temperature range ($\beta 1 <$ etha $< \beta 2$) suitable for starting cylinder injection. $\alpha 1$ and $\beta 1$ correspond to the lower limit of each of the temperature ranges, and $\alpha 2$ and $\beta 2$ correspond to the upper limit of each of the temperature ranges. These values are set in advance by experiments.

If the determinations in steps 112 and 114 is satisfied, the ECU determines in step 116 whether the alcohol concentration in the fuel ealch is higher than the determination value $\gamma$ in order to start the operation using at least cylinder injection. If this determination is not satisfied, the processing proceeds to step 118 to perform cylinder injection in all cylinders under the first startup injection control. That is, in step 118, the ECU performs cylinder injection for each of the two cylinders (first and second cylinders) for which fuel injection is performed during the pressure-feed interval period of the fuel pump. If the determination in step 116 is satisfied, the ECU performs the second startup injection control in steps 120 and 122. That is, the ECU performs cylinder injection for the first cylinder in step 120, and cylinder injection and intake passage injection for the second cylinder in step 122.

On the other hand, if any of the determinations in steps 112 and 114 is not satisfied, the temperature environment is not suitable for cylinder injection. Therefore, the processing proceeds to step 124 to perform intake passage injection for all cylinders. The processing in steps 118, 122, and 124 is performed only during the startup operation and, after the startup operation is ended, distributed injection control is performed as in FIG. 6 that will be described later.

In the first embodiment described above, step 118 in FIG. 3 and the first startup injection control indicate a specific example of first injection control means in claim 1, and steps 120 and 122 and the second startup injection control indicate a specific example of second injection control means. The distributed injection control indicates a specific example of distributed injection control means in claim 2.

Second Embodiment

Figure 4:
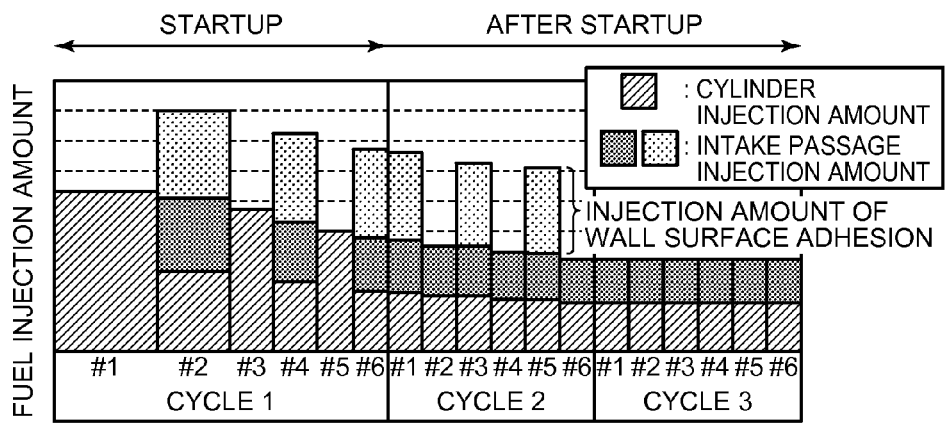
FIG. 4 is a diagram showing the fuel injection state of each cylinder when the state transits from second startup injection control to injection distribution control in a second embodiment of the present invention.

Next, a second embodiment of the present invention is described with reference to FIG. 4 to FIG. 6. This embodiment, almost similar to the first embodiment described above in configuration and control, is characterized in that the amount of fuel adhered to the wall surface of the intake passage (wall fuel adhesion amount) is taken into consideration when transmitting from the second startup injection control to the distributed injection control. In this embodiment, the same numeral is used to denote the same component as that in the first embodiment described above and its description is omitted.

[Characteristics of Second Embodiment]

As described above, when the alcohol concentration in the fuel at a startup operation time is higher than the determination value $\gamma$, intake passage injection and cylinder injection are performed in the second cylinder (for example, cylinders #2, #4, #6) under second startup injection control. At this time, the injection amount addition control is performed to add the wall fuel adhesion amount to the intake passage injection amount. On the other hand, only cylinder injection is performed in the first cylinder (cylinders #1, #3, and #5). Therefore, if the fuel injection amount is set equal for all cylinders when the state transits from this state to the distributed injection control, the air-fuel ratio varies between the first cylinder and the second cylinder due to fuel vaporized from the wall surface of the intake passage in the second cylinder.

To solve this problem, after the state transits from the second startup injection control to the distributed injection control, control (injection amount matching control) is performed in this embodiment to reduce the intake passage injection amount of the second cylinder by the wall fuel adhesion amount as compared with the injection amount of the first cylinder. FIG. 4 is a diagram showing the fuel injection state in the cylinders when the state transits from the second startup injection control to the distributed injection control in the second embodiment of the present invention. As in the example shown in this figure, in the first cycle when the state transits from the second startup injection control to the distributed injection control, the injection amount matching control is performed in such a way that the wall fuel adhesion amount is added to the intake passage injection amount of the first cylinder. On the other hand, in this first cycle, the wall fuel adhesion amount is not added to the intake passage injection amount of the second cylinder. The injection amount matching control is performed only in the first cycle after the state transits to the distributed injection control. More specifically, in the second and the following cycles after the transition, the wall fuel adhesion amount is not added in any cylinders and the intake passage injection amount is set equal for all cylinders.

According to the control described above, after the state transits to the distributed injection control, the injection amount matching control can match the difference between the first cylinder and the second cylinder in the intake passage injection amount (that is, whether or not the wall fuel adhesion amount is added) that is generated by the second startup injection control. This matching control equalizes the amount of fuel, adhered to the wall surface of the intake passage, among the cylinders, thus preventing a variation in the air-fuel ratio between the cylinders.

Figure 5:
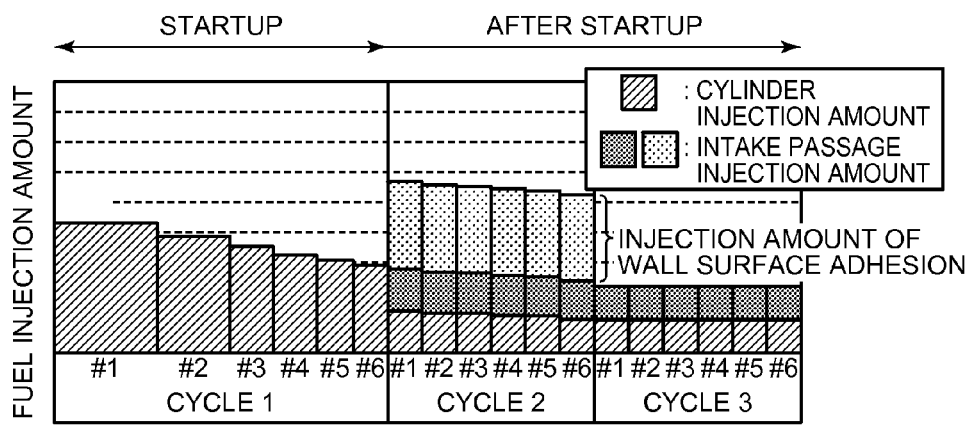
FIG. 5 is a diagram showing the fuel injection state of each cylinder when the state transits from first startup injection control to injection distribution control.

On the other hand, FIG. 5 is a diagram showing the fuel injection state of the cylinders when the state transits from the first startup injection control to the distributed injection control. As shown in this figure, when the state transits from the first startup injection control to the distributed injection control, the wall fuel adhesion amount is added to the intake passage injection amount of all cylinders in the first cycle after the transition. In the second and the following cycles after the transition, the wall fuel adhesion amount is not added in all cylinders. That is, when the state transits from the first startup injection control to the distributed injection control, the intake passage injection amount of all cylinders is set equal beginning in the first cycle. FIG. 4 and FIG. 5 show examples of a six-cylinder engine.

[Actual Processing for Implementing the Second Embodiment]

Next, the actual processing for implementing the second embodiment of the present invention is described below with reference to FIG. 6. FIG. 6 is a flowchart showing the control performed by the ECU in the second embodiment of the present invention. In the routines shown in this figure, the ECU first executes, in steps 200 to 216, the processing similar to that in steps 100 to 116 of the first embodiment described above (FIG. 3). If the determination in step 216 is not satisfied, the alcohol concentration ealch is equal to or lower than the determination value $\gamma$. In this case, the ECU performs the first startup injection control during the startup operation in step 218. After the startup operation, the ECU performs the distributed injection control in step 220.

On the other hand, if the determination in step 216 is satisfied, the alcohol concentration ealch is higher than the determination value and, therefore, the ECU performs the second startup injection control during the startup operation in steps 222 and 224. After the startup operation, the ECU performs the distributed injection control and the injection amount matching control in step 226. In addition, if the determination is not satisfied in any of steps 212 and 214, the processing proceeds to step 228. The ECU performs intake passage injection for all cylinders during the startup operation in step 228 and, after the startup operation, performs the distributed injection control in step 230.

In the second embodiment described above, step 218 in FIG. 6 and the first startup injection control indicate a specific example of first injection control means in claim 1, and steps 222 and 224 and the second startup injection control indicate a specific example of second injection control means. The distributed injection control indicates a specific example of distributed injection means in claim 2, the injection amount addition control indicates a specific example of injection amount addition means in claim 3, and the injection amount matching control indicates a specific example of injection amount matching means. Although a six-cylinder engine is used as an example in the first and second embodiments described above, the present invention is not limited thereto but may be applied to an internal combustion engine with any number of cylinders.

REFERENCE SIGNS LIST

10 Engine (internal combustion engine)
12 Piston
14 Combustion chamber
16 Crankshaft
18 Intake passage
20 Throttle valve
22 Exhaust gas passage
24 Catalyst
26 Intake passage injection valve
28 Cylinder injection valve
30 Spark plug
32 Intake valve
34 Exhaust valve
36 Fuel supply system
40 Crank angle sensor
42 Airflow sensor
44 Water temperature sensor
46 Intake air temperature sensor
48 alcohol concentration sensor (alcohol concentration detection means)
50 ECU

The invention claimed is:

1. A control device for an internal combustion engine, the control device comprising:

an intake passage injection valve provided in each of cylinders of the internal combustion engine for injecting fuel into an intake passage;
a cylinder injection valve provided in each of the cylinders for injecting fuel into an inside of the cylinder;
a fuel supply system configured to pump and pressure-feed fuel to each of the cylinders, and the fuel supply system configured to sequentially inject the fuel into two cylinders during a pressure-feed-interval period, the pressure-feed-interval period being a period from a time one fuel pressure-feed operation is performed to a time a next fuel pressure-feed operation is performed;
an alcohol concentration detector that detects an alcohol concentration in the fuel;
a controller configured to execute a first injection control during the pressure-feed-interval period for injecting fuel from only the cylinder injection valve into a first cylinder and a second cylinder, which are two cylinders for which fuel injection is sequentially performed during the pressure-feed-interval period, when the alcohol concentration in the fuel is equal to or lower than a predetermined determination value; and
the controller configured to execute a second injection control during the pressure-feed-interval period for injecting fuel from the cylinder injection valve into the first cylinder and for injecting fuel from both the intake passage injection valve and the cylinder injection valve into the second cylinder when the alcohol concentration in the fuel is higher than the determination value.

2. The control device according to claim 1 wherein the controller is configured to execute the first injection control and the second injection control only at a time of a startup operation when a predetermined condition is satisfied, and,
the controller configured to execute distributed injection control, instead of the first injection control and the second injection control after the startup operation is ended, the distributed injection control is a control to variably set a fuel injection ratio between the intake passage injection valve and the cylinder injection valve in the first cylinder and the second cylinder respectively according to an operation state of the internal combustion engine.

3. The control device according to claim 2 wherein the controller is configured to add a fuel adhesion amount to a fuel injection amount of the intake passage injection valve in the second cylinder when the second injection control is performed, the fuel adhesion amount being an amount of fuel adhered to a wall surface of the intake passage, and
the controller is configured to set the fuel injection amount of the intake passage injection valve in the second cylinder to an amount smaller than a fuel injection amount of the first cylinder by the fuel adhesion amount when the distributed injection control is performed after the second injection control is performed.

* * * * *